United States Patent Office 3,135,694
Patented June 2, 1964

3,135,694
ALKOXYMETHYL ESTERS OF 2-MERCAPTO 2-THIONO 1,3,2-DIOXAPHOSPHORINANE ACIDS
Gerard A. Loughran, Stamford, and Edwin O. Hook, New Canaan, Conn., assignors to American Cyanamid Company, New York, N.Y., a corporation of Maine
No Drawing. Filed Aug. 7, 1953, Ser. No. 373,055
4 Claims. (Cl. 252—46.6)

The present invention relates to a new class of chemical compounds which are useful as antioxidants, corrosion inhibitors in oil systems, insecticides, and the like, and to the preparation of the same. More particularly, the present invention relates to cyclic dithiophosphates, their uses and their methods of preparation.

A principal object of the present invention is to provide a new class of chemical compounds possessing good antioxidant and corrosion inhibiting properties and capable of incorporation in lubricants to stabilize and improve the same.

Another principal object of the present invention is to provide a new class of chemical compounds possessing good insecticidal properties and capable of use as such in concentrated or solvent-diluted form.

Still another principal object of the present invention is to provide methods of preparation of this new class of chemical compounds.

We have found that cyclic dithiophosphates may be prepared by reacting a selected glycol or dihydroxy alcohol with phosphorus sulfide under suitable conditions and that the resulting acidic reaction product, having useful applications of its own, may be converted to salts or esters possessing other desirable properties and characteristics.

The dihydroxy groups of the glycol are attached to alternate carbon atoms and thus the invention pertains to 1,3-glycols, 2,4-glycols, 3,5-glycols, and so forth.

The following dihydroxy alcohols have been found applicable within the principles of the present invention, but it is to be pointed out that the following list is illustrative and is not to be construed as limitative.

Propanediol-1,3
2,2-dimethylpropane diol-1,3
2,2-diethylpropane-diol-1,3
2-butyl-2-ethylpropane-diol-1,3
2-butyl-2-methylpropane-diol-1,3
2,2-dibutylpropane-diol-1,3
1-phenylpropanediol-1,3
Butanediol-1,3
3-methylbutanediol-1,3
3-phenylbutanediol-1,3
1-cyclohexylbutanediol-1,3
Pentanediol-1,3
Pentanediol-2,4
2-methylpentanediol-2,4
2-methylpentanediol-1,3
3-methylpentanediol-1,3
5-methoxy-2-methylpentanediol-1,3
1-tolylpentanediol-2,4
Hexanediol-1,3
Hexanediol-2,4
2-ethylhexanediol-1,3
3,4-dimethylhexanediol-2,4
Heptanediol-3,5
5-ethyl-heptanediol-2,4
Octanediol-2,4
4-ethyloctanediol-3,4
2,4,4-trimethyloctanediol-3,5

The preparation of the cyclic dithiophosphates is relatively a simple matter and comprises reacting the selected dihydroxy alcohol with phosphorus sulfide under suitable conditions to prepare the acid which may be converted to the salt or ester form, as required or desired. The cyclic dithiophosphate is believed to possess the following structural formula:

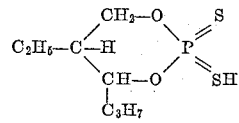

wherein $R_0$, $R_1$, $R_2$, $R_3$, $R_4$ and $R_5$ may be hydrogen, alkyl, aryl, alkaryl, aralkyl or cycloalkyl; and Z is hydrogen or any salt forming radical such as ammonium, an alkali or alkaline earth or heavy metal, or $—CH_2XR$, wherein X is oxygen, sulfur, selenium or tellurium and R is alkyl.

Among the various metal salts which may be employed are those of the salt forming radicals magnesium, calcium, strontium, barium, sodium, potassium, nickel, aluminum, cadmium, tin, zinc, and others. It is to be realized, of course, the acid itself possesses desirable properties and characteristics and may be used in situations where its acidic nature is not desirable.

The invention will be further illustrated in greater detail by the following specific examples. It should be understood, however, that although these examples may describe in particular detail some of the more specific features of the present invention, they are given primarily for purposes of illustration and the invention in its broader aspects is not to be construed as limited thereto.

Example 1

A mixture of 117 g. of 2-ethylhexanediol-1,3 and 89 g. of $P_2S_5$ was heated for approximately 1½ hours at a temperature varying between 88–104° C. The equivalent weight of the reaction mixture was determined to be about 285. The product was filtered hot through a steam-jacketed, Buchner funnel packed with "Hyflo." The yield of the product was approximately 169 g. This material was believed to be a cyclic dithiophosphoric acid having the formula $$C_2H_5-C\begin{matrix}H\\ \end{matrix}\begin{matrix}CH_2-O\\CH-O\end{matrix}P\begin{matrix}S\\SH\end{matrix}$$
$$\phantom{C_2H_5-C-H}|$$
$$\phantom{C_2H_5-C-H}C_3H_7$$

A. The preparation of the ammonium salt was as follows: 85 g. of the acid resulting from the reaction of $P_2S_5$ and 2-ethylhexanediol-1,3 was dissolved at room temperature in 1 liter of benzene. Ammonia gas was then bubbled through the solution. The ammonium salt precipitated immediately. The crystalline material was filtered off and dried. The yield was 70 g. Theoretical yield for the salt of the cyclic acid was 77 g. The product was recrystallized by addition of benzene to a concentrated acetone solution of the product. The material melted at 209–210° C., decomposing with effervescence. A molecular weight determination gave results indicating a valve below 300, which established that the material was not polymeric but cyclic.

B. The preparation of the potassium salt was as follows: 129 g. of the ammonium salt prepared in A above was dissolved in 300 cc. of methyl alcohol. To this solution was added a solution of 32.5 g. of potassium hydroxide (86.4%) in 300 cc. of methanol. The solution was boiled and concentrated until no more ammonium fumes were detectable. The solution was then treated with "Darco" and filtered under suction to give a clear filtrate in which crystals began to form on slight agitation. The crystalline precipitate was filtered off, washed with ether and dried. The yield was approximately 119 g. The material did not melt or decompose below 265° C. The product had the following analysis.

Calculated for $C_8H_{16}PO_2S_2K$:
  Percent phosphorus _____ 11.12
  Percent sulphur _____ 23.03
Found:
  Percent phosphorus _____ 10.0
  Percent sulphur _____ 22.7

The product was believed to be potassium O,O-(1-propyl-2-ethyltrimethylene) dithiophosphate.

C. The preparation of the zinc salt was as follows: 77 g. of the potassium salt prepared in B above was dissolved in 300 cc. of methyl alcohol. A solution of 19.9 g. of anhydrous zinc chloride in 100 cc. of ethyl alcohol was added. This solution was warmed and stirred at 50–60° C. for about one hour. The turbidity gradually increased as potassium chloride precipitated. The solution was then filtered and 11.8 g. of potassium chloride was recovered. The filtrate was stripped to dryness under reduced pressure at 60° C. and the white, impure solid residue was taken up in 350 cc. of benzene to give a cloudy solution. About 100 cc. of benzene was distilled off in order to remove any water, and more potassium chloride deposited. The solution was then filtered and 8.7 g. of potassium chloride was recovered. The clear filtrate was added slowly from a dropping funnel to an evacuated glass still at 65° C. and the solvent was removed under reduced pressure. The zinc salt was obtained as a shimmering, white crystalline solid. The yield was about 72 g. The product had the following analysis.

Calculated for $C_{16}H_{32}P_2O_4S_4Zn$:
Percent zinc _____ 12.02
Percent phosphorus _____ 11.39
Percent sulphur _____ 23.57
Found:
Percent zinc _____ 11.9
Percent phosphorus _____ 10.5
Percent sulphur _____ 22.9

*Example 2*

118 g. of 2-methylpentanediol-2,4 and 111 g. of $P_2S_5$ were stirred over an oil bath at temperatures from about 50° C. to about 60° C. for approximately 1½ hours. The product had an equivalent weight of about 400.5 and was believed to be a cyclic dithiophosphoric acid having the formula:

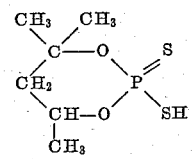

A. The preparation of the ammonium salt was as follows: 135 g. of the acidic product obtained from the reaction of 2-methylpentanediol-2,4 and $P_2S_5$ was dissolved in approximately 450 cc. of benzene. Ammonia gas was then bubbled through the solution causing the precipitation of the ammonium salt. The material was then recrystallized by treating a methyl alcohol solution of the crude ammonium salt with ether. The product melted at about 206–207° C. An analysis gave the following results.

Calculated for $C_6H_{16}PO_2S_2N$:
Percent nitrogen _____ 6.11
Percent phosphorus _____ 13.51
Percent sulphur _____ 27.96
Found:
Percent nitrogen _____ 5.78
Percent phosphorus _____ 13.5
Percent sulphur _____ 27.5

Another preparation made in the same way gave the following analysis:

Percent nitrogen _____ 6.06
Percent phosphorus _____ 13.53
Percent sulphur _____ 27.6

B. The preparation of the potassium salt was as follows: 149 g. of the ammonium salt prepared in A, above, in 150 cc. of methanol was treated with a solution of 42.2 g. of potassium hydroxide (86.4%) in 400 cc. of methyl alcohol. The solution was heated for about one hour and then added slowly from a dropping funnel to an evacuated flask over an oil bath maintained at 50–90° C. in order to remove the ammonia. After removal of the ammonia, the solution was diluted to 500 cc. with methanol and filtered. The clear, water-white filtrate produced crystals on cooling. The yield was about 140 g. The material did not melt but decomposed at about 250–260° C.

C. The preparation of the zinc salt was as follows: A solution of 21.25 g. of anhydrous zinc chloride in 100 cc. of methyl alcohol was added with stirring to a warm solution of 75 g. of the potassium salt prepared in B, above, in 400 cc. of methanol. Turbidity was produced in the solution in a few seconds due to the precipitating of the potassium chloride. The solution was filtered and the filtrate was evaporated to dryness. The impure product was taken up in 400 cc. of benzene and the solution was filtered. The product would not crystallize from benzene, so the benzene was distilled off, leaving behind a viscous yellow gum. The material was warmed with a mixture of 100 cc. of methyl alcohol and 200 cc. of water and filtered. The filter cake was washed with three 100 cc. portions of water to remove the occluded potassium chloride. The resulting product weighed 69 g. The percent yield was 92.3. The material did not melt but decomposed at 187–188° C. An analysis gave the following results.

Calculated for $C_{12}H_{24}P_2O_4S_4Zn$:
Percent zinc _____ 13.40
Percent phosphorus _____ 12.7
Percent sulphur _____ 26.28
Found:
Percent zinc _____ 13.49
Percent phosphorus _____ 10.2
Percent sulphur _____ 25.7

*Example 3*

The preparation of the propoxy methyl ester of the reaction product of 2-ethylhexanediol-1,3 and $P_2S_5$ (Example 1) was as follows: 143 g. of the acid produced from the reaction of 2-ethylhexanediol-1,3 and $P_2S_5$ (Example 1) was mixed with 83 g. of normal propyl formal at room temperature in a 500 cc. Ehrlenmeyer flask. There was a slight exotherm to about 40° C. The mixture was allowed to stand overnight and then was titrated to determine the percent conversion which was found to be 90%. The reaction mixture was neutralized by shaking with 10% aqueous sodium carbonate in a separatory funnel. Since the ester would not separate readily, the mixture was saturated with sodium chloride and the ester layer separated as a clear, dark brown liquid. The aqueous layer was drawn off and the ester layer was treated with 5 g. of "Darco" for two hours. The solution was filtered and dried over anhydrous sodium sulfate. The propoxy methyl ester was believed to have the following structural formula:

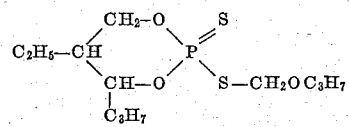

The various cyclic dithiophosphates described above may be employed as antioxidants or corrosion inhibitors in improving lubricants such as hydrocarbon lubricating oils, preferably in amounts ranging from about 0.05% to about 4% by weight. The amount used will depend upon the particular type of lubricant used, upon the purpose for which the lubricant is intended, upon the degree of stabilization required, upon the presence or absence of other additives or improving agents, upon the solubility characteristics involved, etc.

The zinc salts of the cyclic dithiophosphates prepared in Examples 1 and 2 were incorporated in a solvent-extracted Pennsylvania oil of 10-W grade in concentrations approximately 1.0% by weight and subjected to an Underwood oxidation test. In this test, 1500 cc. of the compounded oil is heated for 10 hours at approximately 325° F. in an open container providing free circulation of air while portions of the oil are sprayed continuously against freshly sanded alloy bearings of a standard size. The loss of weight of the bearings determines the amount of the corrosion. The maximum permissible corrosion loss is usually on the order of 250 mg. and the increase in viscosity should not be more than 50%. The two samples selected for the test were well below 250 mg. whereas two control samples without any additives therein were above 250 mg. The increase in viscosity of the compounded oils was less than 50% and considerably less than the increase in viscosity of the control samples of oil.

Although we have described but a few specific examples of our inventive concept, we consider the broad aspects of the same not to be limited to the specific substances mentioned therein but to include various other compounds of equivalent function and constitution as set forth in the claims appended hereto. It is understood that any suitable changes, modifications and variations may be made without departing from the spirit and scope of the invention.

We claim:
1. A cyclic dithiophosphate having the formula:

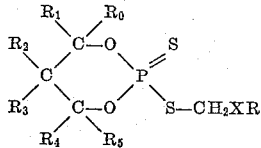

where $R_0$, $R_1$, $R_2$, $R_3$, $R_4$ and $R_5$ are members of the group consisting of hydrogen and alkyl; and wherein X is oxygen and R is lower alkyl.

2. A lubricating oil composition containing a predominant amount of a hydrocarbon lubricating oil and a minor amount of an antioxidant and corrosion inhibitor comprising a cyclic dithiophosphate having the formula:

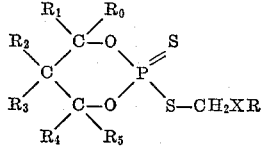

where $R_0$, $R_1$, $R_2$, $R_3$, $R_4$ and $R_5$ are members of the group consisting of hydrogen and alkyl; and wherein X is oxygen and R is lower alkyl.

3. A cyclic dithiophosphate having the formula:

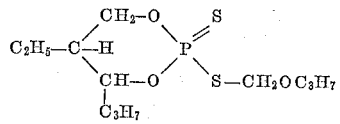

4. A cyclic dithiophosphate having the formula:

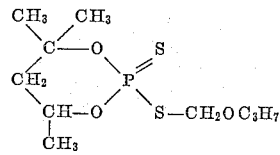

References Cited in the file of this patent
UNITED STATES PATENTS

| | | |
|---|---|---|
| 2,355,106 | Prutton | Aug. 8, 1944 |
| 2,372,358 | Cook et al. | Mar. 27, 1945 |
| 2,382,775 | Cook et al. | Aug. 14, 1945 |
| 2,438,876 | Reiff et al. | Mar. 30, 1948 |
| 2,529,303 | McDermott | Nov. 7, 1950 |
| 2,552,570 | McNab et al. | May 15, 1951 |
| 2,661,365 | Gamrath | Dec. 1, 1953 |
| 2,661,366 | Gamrath | Dec. 1, 1953 |
| 2,892,863 | Lanham | June 30, 1959 |
| 3,006,946 | Lanham | Oct. 31, 1961 |
| 3,070,619 | Lanham | Dec. 25, 1962 |

OTHER REFERENCES

Kosolapoff: "Organo-Phosphorus Compounds," pages 216 and 229, John Wiley and Son Inc., 1950.

Christiansen: "Organic Derivatives of Antimony," page 99, Chemical Catalog Co. Inc.